Figure 1:
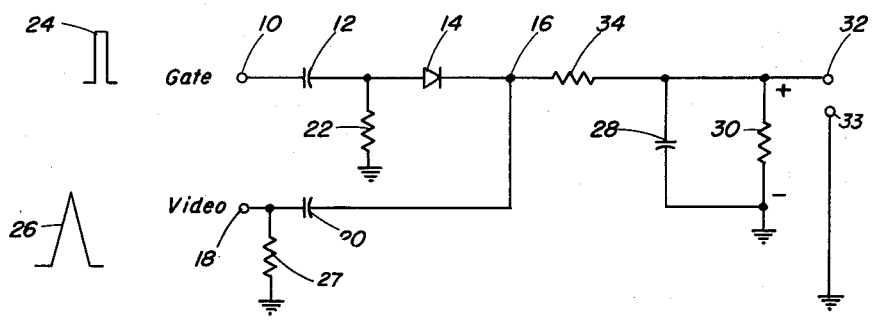

Nov. 6, 1962   J. J. SHEA   3,062,973
COINCIDENCE DETECTION CIRCUIT
Filed Feb. 24, 1960

INVENTOR
James J. Shea

BY Q. Baxter Warner
Claude Funkhouser
ATTORNEYS

United States Patent Office 3,062,973
Patented Nov. 6, 1962

3,062,973
COINCIDENCE DETECTION CIRCUIT
James J. Shea, Scotch Plains, N.J., assignor, by mesne assignments, to the United States of America as represented by the Secretary of the Navy
Filed Feb. 24, 1960, Ser. No. 10,819
1 Claim. (Cl. 307—88.5)

This invention relates to coincidence detecting circuits and more particularly to a circuit for detecting the coincidence or lack of coincidence between a repetitively received input signal and a locally generated repetitive gate signal.

A coincidence detecting circuit is an apparatus arranged to provide an indication when a plurality of signals occur identically in phase and time. For example, in a radar receiver a repetitive input pulse signal is locally received and detected, but the information desired from the return signal is not so much whether it actually occurs but its precise time of occurrence. The time of occurrence can be portrayed on a cathode ray type of depiction by drawing a time base line on the cathode ray tube and measuring the length of the trace from the origin of the base line to the occurrence of the return signal.

In many systems, however, it is desirable to utilize the return signal for other purposes than a mere visual representation. For example, in tracking radar systems the return signal is utilized to operate servo equipment which, in turn, re-tunes the radar receiver and orients the radar antenna in such a manner as to maintain the radar system engaged with a particular target.

Coincidence detection systems have many other uses. For example, coincidence detection circuitry may be used to advantage in gated automatic gain control systems. In such automatic gain control systems, if the time of occurrence of a return signal is approximately known, the gain of the local receiver may be increased or decreased as desired at the time when the return signal is to occur.

A conventional method of detecting such coincidence is to provide a gating or clipping circuit attached to an input signal lead which enables the input signal lead at such time as the input signal is expected by means of a locally generated carrier signal. If the signal passes through the gate it then must have occurred at the time when expected in accordance with the locally generated carrier and may be detected with the usual detection means and accompanying filter circuit. This arrangement has disadvantages in that it ordinarily requires many vacuum tubes and attendant circuit elements and power requirements.

Accordingly, it is an object of the present invention to provide a coincidence detecting means which is rapid and reliable in operation and employs a minimum of components.

It is a further object of this invention to provide an improved coincidence detector means employing but a single diode and no amplifying or active power consuming means.

Another object of this invention resides in the provision of an improved coincidence detector for gating an input signal by means of a diode clamping circuit designed to charge a time constant circuit in the absence of an input signal wherein the presence of an input signal may be detected by the drop-off in charge of the time constant circuit.

In accordance with one embodiment of the present invention, a source of gate pulses is rectified to charge a time constant circuit including a capacitor arranged to discharge rather slowly. There is also provided a connection for a source of signal pulses. When the signal pulses coincide with the aforementioned gate pulses, the time constant circuit will not receive charge from the gate pulses because the intervening diode will be cut off by the coincidence signal. The D.C. output is detected as a drop in D.C. voltage across the time constant circuit.

Figure 2:
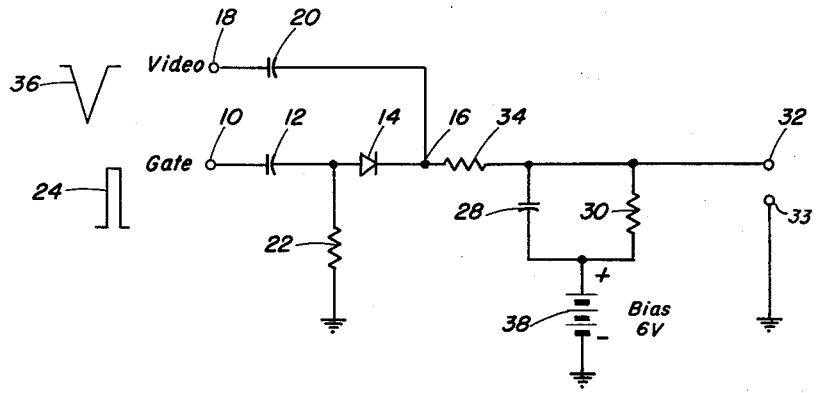

Other objects and many of the attendant advantages of this invention will be readily appreciated as the same becomes better understood by reference to the following detailed description when considered in connection with the accompanying drawings wherein:

FIG. 1 is a circuit diagram of one embodiment of the present invention; and
FIG. 2 is a circuit diagram of a second embodiment of the invention.

Referring to FIG. 1, the terminal 10, for connection to a source of periodic gate pulses, is coupled by a capacitor 12 to the rectifying diode 14 poled to conduct positively from said source of gate pulses to a common point or junction 16. Terminal 18, connected to a source of periodic video signals which are to be detected, is likewise coupled through a capacitor 20 to the common junction 16. Resistor 22 returns the output end of capacitor 12 to ground for the purpose of discharging coupling capacitor 12 between recurrent gate pulses 24. Video input resistor 27 returns video input terminal 18 to ground and likewise facilitates the charging and discharging of video input capacitor 20. Wave form 26 represents the input video signal which is to be detected. The time constant circuit including capacitor 28 shunted by resistor 30 couples output terminal 32 to ground. The time constant of this circuit is such that resistor 30 will discharge capacitor 28 slowly between recurrence of gate pulses 24. However, capacitor 28 is not discharged so slowly that the reduction in D.C. charge across capacitor 28 cannot be detected should gate pulse 24 fail to recharge capacitor 28 to its normal charge. A video dropping resistor 34 joins common point 16 to the output terminal 32.

In operation, the circuit of FIG. 1 detects video signals 26 introduced at terminal 18 by means of registering a reduction in D.C. charge across capacitor 28 at such time as a video signal 26 occurs simultaneously with the gate signal 24. The manner in which this is accomplished will now be described. In the absence of the video signal, gate signal 24 is rectified by means of a diode 14 and charges capacitor 28 to a positive D.C. level in accordance with the D.C. level of gate signal 24. For example, if gate signal 24 is a five volt signal, capacitor 28 normally will be charged to approximately 5 volts providing the input capacitor 12 is of relatively low impedance as viewed by the pulse signal and the video dropping resistor 34 as well as rectifier 14 have relatively low D.C. resistance to the input gate signal. Capacitor 28 is of such a value that it is capable of maintaining considerable charge between recurrence times of gate pulse 24. However, should a video signal 26 of positive polarity occur at the same time as gate signal 24 and be coupled through capacitor 20 to the common junction 16, it will be seen that the rectifier 14 will not conduct and therefore gate signal 24 will be incapable of re-charging capacitor 28. The reduction in D.C. charge on capacitor 28 can be immediately and conveniently recognized by means obvious to those skilled in the art. The video signal is of such a nature and impedance that capacitor 28 represents a substantial short circuit thereto. However, resistor 34 prevents the video signal appearing at common point 16 from being completely shorted out by capacitor 28. The video signal appears, therefore, across resistor 34 and is clamped at substantially the D.C. level produced by the gate. The D.C. output change across the capacitor 28 is proportional to the video level, being zero when the video level is equal in voltage to the gate amplitude. Therefore, the gate and the video signal should ordinarily be chosen to be of different amplitudes so that the D.C. output change may be readily detected.

The circuit of FIG. 2 operates in a manner similar to the circuit of FIG. 1. However, the circuit of FIG. 2 has a more rapid response time and produces improved overall operation. An additional voltage bias source is employed in the circuit of this embodiment. In FIG. 2 like components have like reference numerals and identical functions to the circuit already described in connection with the embodiment of FIG. 1. Therefore, these circuit components will not be described again in detail.

In the circuit of FIG. 2 the time constant circuit comprising a parallel combination of capacitor 28 and resistor 30 is not returned to ground as in FIG. 1, but is returned to the positive end of a bias source 38 which is in turn connected to ground. The bias source may, for example, be a six-volt bias battery poled to deliver a positive six volts at the bottom end of the time constant circuit. The circuit of FIG. 2 is designed to detect negative video signals although it is apparent that various combinations and polarities of video signals and gate signals could be accommodated by providing different bias voltages.

In the circuit of FIG. 2 a negative going video signal 36 is applied to video input terminal 18 and coupled to common point 16 by means of coupling capacitor 20. The gate signal 24 is arranged to be of a slightly lower voltage than that supplied by the bias source 38. For example, if the bias source is a positive 6-volts then a positive 5-volt signal 24 may be applied to terminal 10. Since the diode rectifier 34 normally is cut off, the voltage at output terminal 32 is substantially equal to the bias voltage of source 38. When the amplitude of a negative video signal, equal in time to the gate pulse 24, is greater in voltage than the difference between the amplitude of gate signal 24 and the bias from source 38, diode rectifier 14 conducts and capacitor 28 is charged to a negative 1-volt, i.e., the difference between the bias voltage and the gate voltage through diode 14 and resistor 34. The video signal is again dropped across resistor 34 and does not appear across capacitor 28. The change in D.C. level of capacitor 28 is detected at output terminals 32 and 33 thereby registering the coincidence of the video signal and the gate pulse.

Many changes could be made and various equivalents substituted for the components employed in the circuit without departing from the spirit of the present invention. For example, various forms of coupling circuits could be employed to introduce the video and gate signals to the common junction 16 provided a unilateral impedance is applied to rectify the gate signal so that it may in turn charge or discharge a time constant network represented by the capacitor 28 and resistor 30. Various forms of voltage levels and bias levels may also be employed in the present invention. The circuit is designed to operate at very high pulse repetition rates and with very short duration pulses. For example, the pulse length employed for the gate pulse 24 in one circuit constructed in accordance with the present invention is .3 microsecond. The video signal length is, of course, of the same order.

Thus, an improved coincidence detector and timing circuit and an improved method of detecting the coincidence of pulses and pulse signals is provided by the present invention. Since no vacuum tubes are used the circuit will operate over extended periods of time without failure due to changing tube characteristics. The circuit is reliable and functions with rapid pulse signals of very short duration such as those encountered with returning radar signals.

Obviously many modifications and variations of the present invention are possible in the light of the above teachings. It is therefore to be understood that within the scope of the appended claims the invention may be practiced otherwise than as specifically described.

What is claimed:

A coincidence detector comprising a source of gate pulses, a source of video signals to be detected, a common point, a unidirectional impedance coupling said source of gate pulses to said common point, a capacitor joining said source of video signals to said common point, an output terminal, a source of bias voltage with respect to ground, an R-C time constant circuit coupling said bias source to said output terminal, and a video dropping element between said common point and said output terminal.

References Cited in the file of this patent

UNITED STATES PATENTS

| 2,755,441 | Gulnac | July 17, 1956 |
| 2,761,130 | Kibler | Aug. 28, 1956 |
| 2,877,421 | Emanuelsson | Mar. 10, 1959 |